June 19, 1956  E. G. ORAVEC  2,751,179
VIBRATION ISOLATOR
Filed Feb. 9, 1953  3 Sheets-Sheet 1
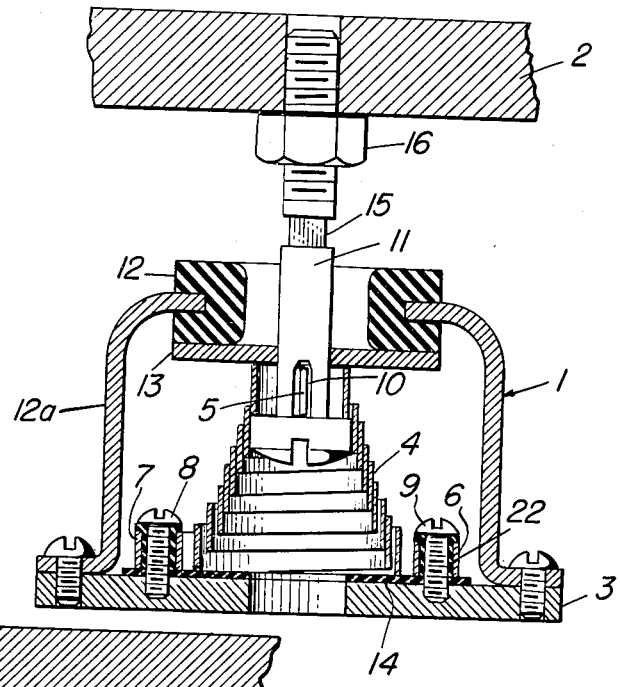
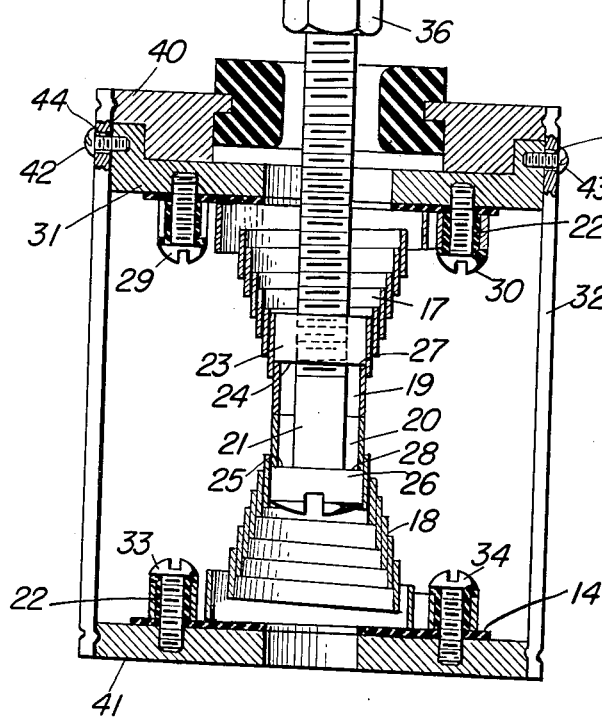
Inventor
Emil G. Oravec
By his attorneys
Howson and Howson

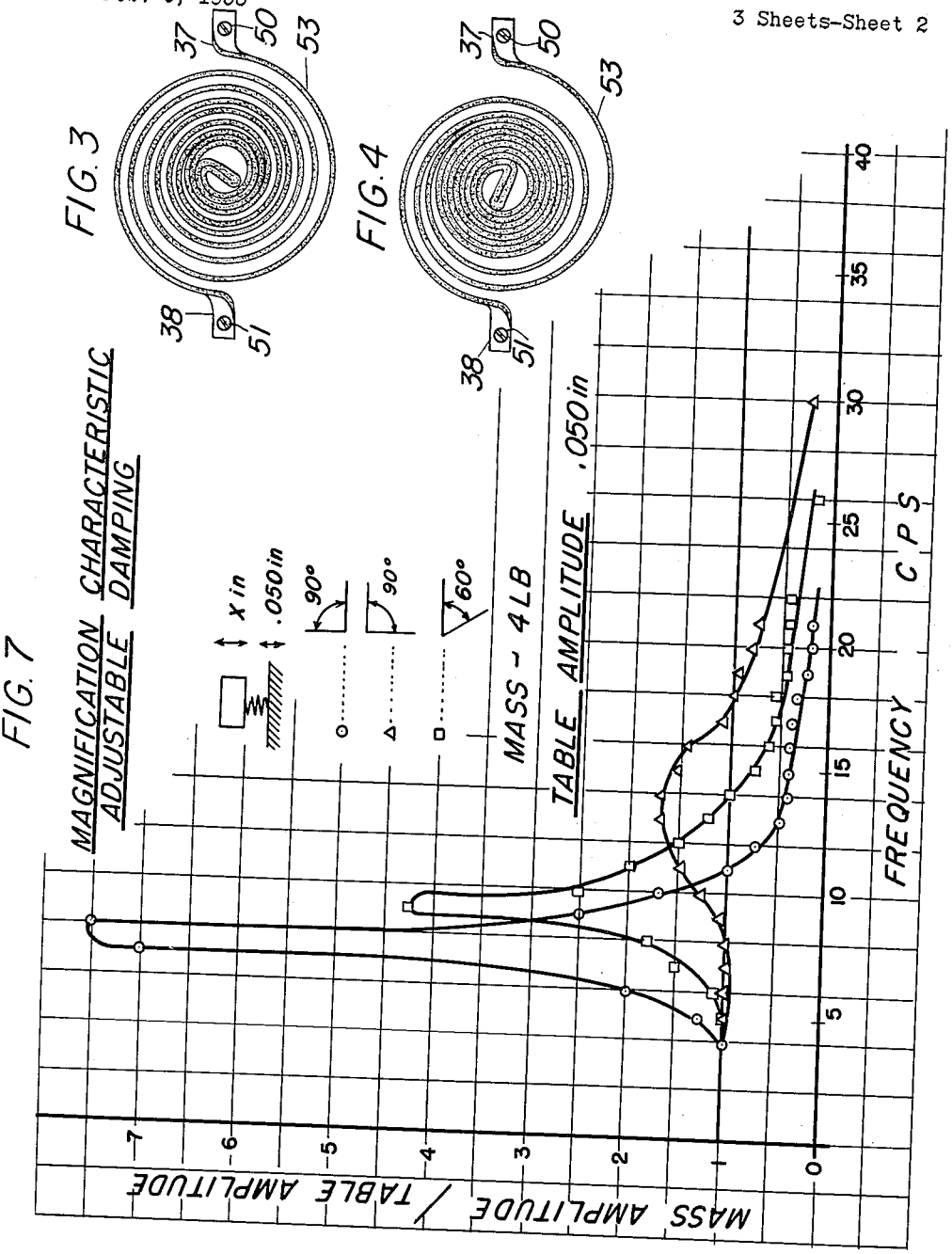

June 19, 1956  E. G. ORAVEC  2,751,179
VIBRATION ISOLATOR
Filed Feb. 9, 1953  3 Sheets-Sheet 3
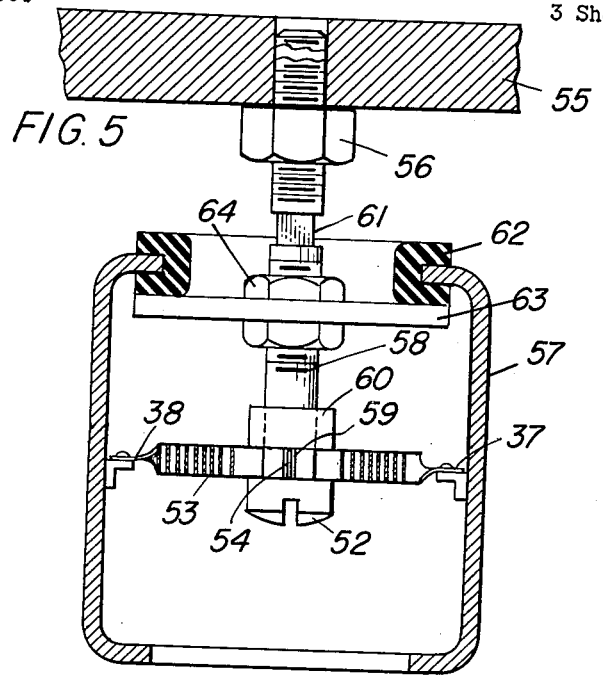
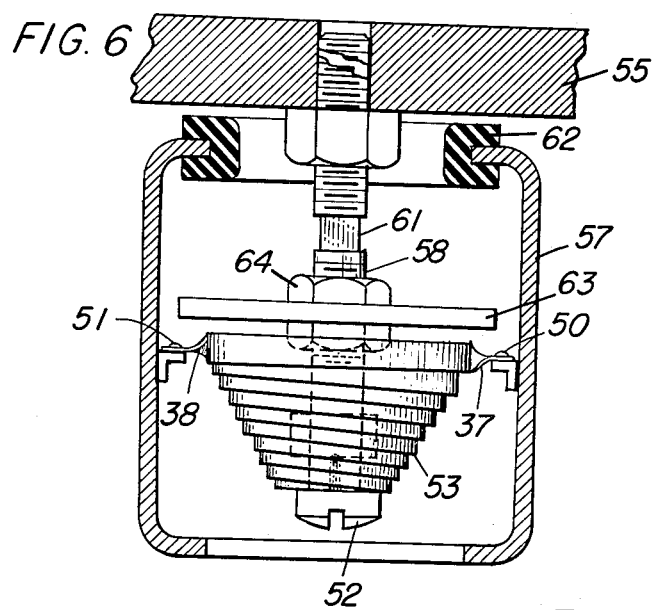
Inventor
Emil G. Oravec
By his attorneys
Howson and Howson

United States Patent Office 2,751,179
Patented June 19, 1956

2,751,179

VIBRATION ISOLATOR

Emil G. Oravec, New Haven, Conn., assignor, by mesne assignments, to Textron American, Inc., Providence, R. I., a corporation of Rhode Island Application February 9, 1953, Serial No. 335,946

5 Claims. (Cl. 248—358)

This invention pertains to vibration isolators and more particularly to vibration isolators having adjustable damping characteristics.

In the past, vibration isolators made of rubber have been used in aircraft, automobiles and other means of transportation.

With the development of jet and rocket-powered aircraft designed to fly at extremely high altitudes, however, it has been found that rubber isolators freeze and become inoperative. Moreover, the extreme speeds reached by such aircraft at high altitudes cause heat to be generated in certain parts of the aircraft, resulting in temperatures above those recommended for rubber. It has, therefore, become necessary to develop isolators which will endure both extremes of temperature.

Various isolator designs have been proposed for obtaining these characteristics. However, so far as is known, the designs so proposed have had large amplitudes at resonant frequencies and have been unsatisfactory for this reason.

The present invention provides a vibration isolator capable of functioning satisfactorily at extremes of temperature and whose amplitude at resonance can be adjustably dampened to limit the excursion of equipment mounted thereon to suit the requirements of the installation. In accordance with the invention, a volute spring is utilized as the resilient element of an isolator and means are provided for tightening the spring, thus increasing frictional forces between the turns of the spring and damping the movement of the mount in a direction axially of the spiral of the spring.

In the drawings:

Figure 1 is an elevational view, partly in section of the preferred form of vibration isolator according to the invention, having a conical volute spring;

Figure 2 is an elevational view partly in section of a modified form of isolator according to the invention, having two conical volute springs;

Figure 3 is a plan view of a flat volute spring as used in a third form of the invention, the spring being substantially relaxed;

Figure 4 is a plan view of the spring shown in Fig. 3, but after having been tightened;

Figure 5 is a view in elevation of an isolator using a flat volute spring of the type shown in Fig. 3, the spring being in a substantially relaxed position;

Figure 6 is a view in elevation of the isolator shown in Fig. 5 after having been tightened and extended;

Figure 7 is a graph showing how the magnification characteristics of vibrators according to the invention may be adjusted;

Figure 8 is a perspective view of a conical volute spring such as used in the embodiment of Fig. 1.

In this specification and the accompanying claims, the term "volute" spring is used in the broad sense of the word to include substantially flat springs where all the turns are in substantially the same plane, and conical volute springs. It does not include cylindrical helical springs.

Turning now to the drawings, Fig. 1 represents the preferred embodiment of the invention. In Fig. 1 an isolator, indicated generally as 1, is shown used to mount a supported member or load 2 on a supporting member 3. It will be understood that the terms "supported" and "supporting" are applied to the members 2 and 3 as a matter of convenience, and might be reversed, or the members 2 and 3 might be mutually supporting. The two members generically are support members. The isolator comprises a compound conical volute substantially flat spring 4 comprising two strips of spring steel wound parallel with one another, the ends 5 inside the coil, being joined, as shown more clearly in Fig. 8. The ends 6 and 7 are located outside the coil and are secured by suitable connecting means, such as by screws 8 and 9, to supporting member 3. The common end 5 of the spring 4 is located inside the coil and is engaged in a recess 10 provided in an adjusting element such as a rod or screw 11. This screw is threaded into the support member 2. Thus by turning screw 11 relative to supporting member 3, the turns of the spring may be tightened upon one another and the circumferential setting of the inside ends of the coil with respect to the outside ends thereof, and, hence, the tightness of the coil, may be readily adjusted. I provide a round rubber snubber 12 mounted on a casing 12a surrounding the screw 11. If the spring is heavily loaded, the snubber 12 may snub the supported member or load 2. In order that upward vertical movement may be limited, I provide a snubbing washer 13 on the screw 11 below snubber 12.

I provide an element 14 below the spring known as a noise block. This is a piece of rubber-like material which is placed between two metallic elements to reduce the transmission of high frequencies or "noises" from the vibrating object to the supporting structure. These high frequencies are substantially higher than the frequencies which the main spring element is designed to isolate. The noises may be in the audible range. Noise blocks can be used in any of the structures illustrated in this application. The showings in Figs. 1 and 2 will make their installation obvious in the structure of Figs. 5 and 6. There is a rubber-like pad 14 extending across the top of the supporting member underlying the entire coil spring 4 including the outer ends 6 and 7. In addition to the noise block 14 I provide noise blocks 22 between the ends 6 and 7 of the spring 4 and the screws 8 and 9 which fasten them to the supporting member. This is a separate piece of material from the flat noise block 14. It takes the form of a sleeve with a flange. The flange may be a separate washer, if desired. It will be noted that the noise block 14 also serves as a snubber to cushion the downward movements of the spring.

Adjusting screw 11 is threaded into the member 2 and may be turned by means of wrench flats 15 and locked in the desired position by lock nut 16.

In operation, when a load is applied through supporting member 2, screw 11 moves down, compressing the spring 4. The movement is limited by the tension of the spring, and also by the frictional resistance of the turns of the spring sliding against adjacent turns. When screw 11 is turned, spring 4 is tightened, bringing the turns of the spring in closer contact with one another (i. e., increasing the forces normal to the interior surfaces of the spring), and so increasing the frictional forces resisting compression of the spring.

The effect of tightening the spring is strikingly shown in Fig. 7. To obtain the results illustrated in that figure, an isolator of the type shown in Fig. 1 was loaded with a mass having a weight of four pounds. The loaded isolator was fixed to a table and the table was subjected to vibrations having amplitudes of .050 inch, and various frequencies. The amplitude of the mass was measured for several spring adjustments, and the magnification characteristic (defined as mass amplitude/table amplitude) was plotted against frequency. The curve following the circled points was obtained with a spring tightening adjustment of 90°, i. e., the small end of the spring was moved through 90° from its relaxed position. From Fig. 7 it will be seen that with this adjustment the magnification was about 7.5 at a resonant frequency of 8 cycles per second. When the spring was tightened to 180° the magnification factor had fallen to about 1.7, the resonant frequency moved up to about 13.5 cycles per second, and the curve had smoothed out to a great extent. This is indicated by the curve following the triangle enclosed points. An intermediate tightening of 150° gave intermediate results, although the shape of the curve more nearly resembled that at 90° than that at 180°. The reductions in resonant response or magnifications do not sacrifice the ability to attenuate vibratory motions at higher frequencies above resonance, as shown by the response of the curves below the mass amplitude/table amplitude ratios of less than 1 in Fig. 7.

A second embodiment of the invention is shown in Fig. 2. In that embodiment two conical volute springs 17 and 18 of the type described in connection with Fig. 1 are mounted with their small ends 19, 20 fastened together. A transmitting rod or screw 21 carries a retaining nut 23, the arrangement of screw 21 and nut 23 being such that the lower face 24 of nut 23 and the upper face 25 of head 26 of screw 21 abut the upper and lower edges 27, 28 of the small ends 19 and 20 of springs 17 and 18, respectively.

The isolator is enclosed in a housing 32 having cover plates 40 and 41. Spring 18 is fixed to cover plate 41 as by screws 33 and 34. Spring 17 is fixed to a washer 31 located inside the top of housing 32 by means of screws 29 and 30. Washer 31 is held in place by retaining screws 42 and 43 which pass through a slot 44 in housing 32, the slot extending for about 270° around the housing. The construction has noise blocks 14 and 22 similar to those of Fig. 1.

This mounting arrangement permits the isolator to be pre-set at a desired tightness and then installed as a unit as so pre-set. The setting is accomplished by loosening retaining screws 42 and 43 and then rotating the washer 31, causing both springs to tighten. When the desired tightness is attained, the retaining screws can then be tightened into binding relation with housing 32, and a pre-set isolator is available for installation.

As shown in Fig. 2, the installation may be accomplished by attaching the transmitting screw extension 22 to a supported member, indicated in Fig. 2 as 35. The bottom of the mounting, i. e., cover plate 41, may then be attached to a supporting member, such attachment not being shown in Fig. 2.

Still another embodiment of the invention is shown in Figs. 3–6. The spring element 53 used in this embodiment is the flat volute, rather than the conical volute form shown in Figs. 1 and 2.

Figs. 3 and 5 show the spring in its relaxed position, Figs. 4 and 6 in a tightened position, the spring being axially extended in Fig. 6.

As shown in Figs. 3–6, the spring is attached at its outer ends 37, 38 to a housing 57 as by screws 50, 51. The joined inner ends 54 of the spring are secured to an adjusting screw 58 by passing the inner ends of the spring through a slot 59 in the screw, in the manner similar to that described in connection with Fig. 1. A retaining nut 60 and the head 52 of the screw 58 aid in keeping the spring in its proper place on the screw.

In order to provide snubbing in the construction of Figs. 5 and 6, I provide a rubber snubber 62 on the casing 57 similar in general character to the snubber 12 in Figs. 1 and 2. On the screw 58 is a metal snubbing washer 63 held in position by lock nuts 64. When the coil spring element 53 is extended upwardly, the metal washer 63 strikes against the rubber snubber 62. When the spring element is extended downwardly under load, as shown in Fig. 6, the supported element 55 engages the rubber snubber 62 before the washer 63 can strike the spring element.

The isolator may be attached to a supported member 55 as by a locknut 56. The housing 57 may be fixed to a supporting member (not shown) in any convenient manner.

In operation, a load placed on supporting member 55 in a direction along the axis of the isolator causes spring 53 to extend in the manner shown in Fig. 6. Such movement is resisted by the tension of the spring and also by the frictional forces of the turns of the spring sliding upon one another. In accordance with the invention, these frictional forces may be increased by tightening the spring through turning adjusting screw 58, wrench flats 61 being provided for this purpose, and thus the damping characteristics of the spring may be varied.

Spring elements used in this invention may be made of various materials, such as steel, non-ferrous metals, and non-metallic substances such as synthetic resins. As shown in the drawings, the spring elements are preferably compound, being wound to have two outer ends and one inner end. However, other types of volute springs may be employed which have at least one end inside the coil and at least one end outside the coil.

Isolators according to the invention may be adjusted to have a magnification factor of 1.5 or even less. This compares very favorably with rubber isolators and with previously offered low temperature isolators.

What I claim is:

1. A vibration isolator comprising a spring element made of flat strip material wound in at least one volute coil and having at least one end inside the coil and at least one end outside the coil with at least one turn of the coil in contact with adjacent turns thereof to dampen axial movements of the inside end of the coil with respect ot the outside end thereof, two spaced support members, and means connecting said support members, respectively, to the inside and outside ends of the coil so as to hold said ends against relative circumferential movement, said connecting means including an adjusting element connected to one of said ends of the coil and to one support member and adapted to adjust the circumferential setting of the inside and outside ends of the coil with respect to each other and thereby the tightness of the coil, whereby the isolator can be given a new dampening characteristic with respect to relative movement between the support members in a direction axially of the coil.

2. A vibration isolator according to claim 1 in which the adjusting element is connected to the inside end of the coil and comprises a threaded screw carried by one of the support members.

3. A vibration isolator according to claim 2 in which a housing is connected to the other of said support members, a snubber on the housing, and a washer fixed on the threaded screw between the coil and the snubber and adapted to engage the snubber upon movement of said screw.

4. A vibration isolator according to claim 1 in which the coil is a compound volute spring having two ends outside the coil both of which are fastened to the same support member, and in which said compound volute spring has a single inner end.

5. A vibration isolator according to claim 1 in which the spring element comprises two conical volute coil springs disposed in axial alinement with their inner ends fastened together at the axial center of the isolator and their other ends located outside said springs, and wherein said connecting means includes a threaded screw having one end connected to one of said support members and its other end connected to the inner ends of said springs, a housing connecting the outside ends of said two springs and adjustable with respect to the other support to adjust the circumferential setting of the inner and outer ends of said springs with respect to each other and thereby the tightness of the coils, and means for retaining said housing in its adjusted position with respect to said other support.

References Cited in the file of this patent

UNITED STATES PATENTS

| | | |
|---|---|---|
| 255,835 | Berry | Apr. 4, 1882 |
| 337,048 | Davis | Mar. 2, 1886 |
| 978,091 | Wessel | Dec. 6, 1910 |
| 1,922,921 | Anderson | Aug. 15, 1933 |
| 1,948,788 | Goldberg | Feb. 27, 1934 |
| 2,105,651 | Holland | Jan. 18, 1938 |
| 2,438,757 | Lee | Mar. 30, 1948 |
| 2,484,983 | Dath | Oct. 18, 1949 |
| 2,610,017 | Lambert et al. | Sept. 9, 1952 |

FOREIGN PATENTS

| | | |
|---|---|---|
| 278 | Great Britain | of 1854 |
| 11,662 | Great Britain | of 1847 |